United States Patent [19]

Krafft et al.

[11] Patent Number: 5,443,944
[45] Date of Patent: Aug. 22, 1995

[54] PHOTOGRAPHIC MATERIAL

[75] Inventors: Werner Krafft, Leverkusen; Friedrich Jonas, Aachen; Prem Lalvani, Leverkusen, all of Germany; Hartwig Andries, Mortsel; Willem Mües, Tremelo, both of Belgium

[73] Assignee: Agta-Gevaert AG, Leverkusen, Germany

[21] Appl. No.: 290,597

[22] Filed: Aug. 15, 1994

Related U.S. Application Data

[63] Continuation-in-part of Ser. No. 145,577, Nov. 4, 1993, abandoned.

[30] Foreign Application Priority Data

Nov. 16, 1992 [DE] Germany .................. 42 38 628.4

[51] Int. Cl.$^6$ ................... G03C 1/89; G03C 1/76
[52] U.S. Cl. .................. 430/529; 430/140; 430/496; 430/501; 430/527; 430/533; 428/694 B; 428/694 SL; 428/694 BP; 428/694 BS
[58] Field of Search .......... 430/140, 496, 501, 527, 430/529, 533; 428/694 B, 694 SL, 694 BP, 694 BS

[56] References Cited

U.S. PATENT DOCUMENTS

| | | | |
|---|---|---|---|
| 3,782,947 | 1/1974 | Krall | 430/495 |
| 4,279,945 | 7/1981 | Audran et al. | 427/130 |
| 4,302,523 | 11/1981 | Audran et al. | 430/140 |
| 4,990,276 | 2/1991 | Bishop et al. | 252/62.54 |
| 5,035,926 | 7/1991 | Jonas et al. | 427/393.1 |
| 5,147,768 | 9/1992 | Sakakibara | 430/501 |
| 5,312,681 | 5/1994 | Muys et al. | 430/527 |
| 5,370,981 | 12/1994 | Krafft et al. | 430/527 |
| 5,391,472 | 2/1995 | Muys et al. | 430/496 |

FOREIGN PATENT DOCUMENTS

| | | |
|---|---|---|
| 0466130 | 1/1992 | European Pat. Off. . |
| 0467300 | 1/1992 | European Pat. Off. . |
| 0476535 | 3/1992 | European Pat. Off. . |
| 91/11750 | 8/1991 | WIPO . |

*Primary Examiner*—Janet C. Baxter
*Assistant Examiner*—Mark F. Huff
*Attorney, Agent, or Firm*—Connolly & Hutz

[57] ABSTRACT

A photographic material comprising a transparent film support having on one side at least one light-sensitive layer and on the other side a transparent magnetic layer and an antistatic layer of a polythiophene arranged above or below said transparent magnetic layer shows transparency and good mechanical and antistatic properties.

11 Claims, No Drawings

PHOTOGRAPHIC MATERIAL

This is a continuation-in-part application of Ser. No. 08/145,577 filed Nov. 4, 1993, now abandoned.

Photographic materials having transparent magnetic backings are described in U.S. Pat. Nos. 3,782,947, 4,279,945, 4,302,523 and 4,990,276, in WO 91/11750 and in EP 466 130, 467 300 and 476 535.

These transparent magnetic layers enable the user of the film as well as the film processor to store and recall data. At the same time, the transparency of the layer enables negative and positive films and copies to be produced from these films without loss of quality.

The above-mentioned transparent magnetic layers use $\gamma$-$Fe_2O_3$ (optionally doped or treated with cobalt on the surface) as magnetic pigment which, free from binder, is dispersed in a high boiling solvent or in a binder solution as is known from the production of audio or video tapes.

The dispersion of magnetic pigments which may contain various additives for improving the mechanical properties (e.g. slip improvers and hardeners) is normally applied to the film support from a slotted casting device on account of its relatively high viscosity (about 500–1000 mPas). The supports may be films of polyethylene terephthalate (PET), PET modified with sulphoisophthalic acid (SIP-PET), polycarbonate (PC), cellulose triacetate (CTA) or cellulose mixed esters.

The choice of organic solvents depends on the support used and the binder for the magnetic layer as well as on the conditions of application and drying of the casting machine.

As a rule, the magnetic layer is the first layer to be applied to the film support on one side and only then are the light sensitive photographic layers applied to the other side of the film support.

A bonding layer is optionally applied between the film support and the magnetic layer, for example a layer of a copolymer of 88% by weight of vinylidene chloride, 10% by weight of methyl acrylate and 2% by weight of itaconic acid.

Due to the high casting speeds in the production of photographic materials and the well-known ease with which plastics films become electrostatically charged when rolled up and unrolled, electrostatic discharges are liable to occur during the casting process, giving rise to the formation of flashes (unrolling flashes) which pass through the transparent film support and cause premature exposure in the light sensitive layer.

It is therefore desirable to provide the film support with an antistatic layer on the same side of the film support as said magnetic layer which prevents such flashes. At the same time, such an antistatic layer prevents or greatly reduces the tendency of the material to attract dust and is therefore an advantage both for the copying process and for magnetic recording and the reading process.

Such an antistatic layer may be applied either over or underneath the transparent magnetic layer.

If the antistatic layer is applied over the magnetic layer then it is also necessary to provide a covering layer whose surface properties must fulfil the photographic requirements as regards slip and sticking properties under normal atmospheric and tropical conditions as well as having the mechanical strength required on account of the mechanical stresses produced by the magnetic head.

If the antistatic layer is applied underneath the transparent magnetic layer, then the magnetic layer acts as an insulating layer on account of its thickness and composition, and the effectiveness of the antistatic layer then cannot be determined by the usual method of measuring the surface conductivity or the reciprocal surface resistance. In that case, it is necessary to measure the time required for an applied voltage to die down.

For this purpose, the sample of film carrying the magnetic layer and the antistatic layer is introduced into an alternating current field between two voltage electrodes and by measuring the difference in frequency with and without the film it is possible to determine the decay time of the charges and by applying a conversion factor to this result it is possible to determine the conductivity of the layer as a surface resistance in $\Omega$ per unit square.

Any layers containing ionogenic or electronically conductive antistatic agents are suitable for this arrangement of layers.

The antistatic agents hitherto described and to some extent also used in practice have without exception more or less serious defects which have led to the search for a suitable antistatic agent for antistatically equipping the transparent magnetic layer described here.

Vanadium pentoxide is not advisable for use in practice on account of its toxicity. Moreover, it does not tolerate the addition of a binder which is essential for improving the properties of the layers. Polyanilines must be eliminated on account of their high intrinsic colour.

Doped $SnO_2$ can only be employed with considerable technical expenditure on account of the problems entailed in grinding this substance and it requires the addition of highly viscous binders to the casting solution in order to prevent sedimentation. It therefore requires relatively expensive casting systems.

Polystyrene sulphonic acid, which is used very frequently for antistatic layers, is readily water-soluble and therefore has the serious disadvantage that its antistatic effect is not permanent.

It was an object of the present invention to provide an antistatic layer free from the above-mentioned disadvantages for photographic materials which carry a transparent magnetic layer on one-side of the support.

It has now been found that this problem may be solved with a polythiophene, in particular polyethylene dioxy-thiophene.

Polythiophenes have a combination of the following advantages: Electronic conductivity with little intrinsic colour, permanence of conductivity after processing and independence of the conductivity from the relative humidity of the atmosphere.

The photographic materials with transparent film supports may be conventional films such as black-and-white negative films, black-and-white reversal films, colour negative films and colour reversal films as well as special films such as films for microradiography, X-ray diagnostics, IR-photography, etc.

The film supports may be, for example, sheets of cellulose acetate, in particular of cellulose triacetate, polycarbonates and in particular polyesters. Particularly suitable polyester supports are those of copolyesters containing from 90 to 98 mol-% of polyethylene terephthalate and from 2 to 10 mol-% of polyethylene sulphoiso-phthalate and optionally other commonly used polyesters. Preferably polyethylene naphthalate is used as the film support.

Suitable polythiophenes are in particular those containing anions of polymeric carboxylic acids or polymeric sulphonic acids. They are prepared in particular by oxidative polymerisation of thiophene in the presence of polymeric carboxylic acids or polymeric sulphonic acids according to EP-A-440 957.

In a preferred embodiment, the magnetic pigment is used in a quantity of from 30 to 100 mg/m$^2$ and the polythiophene in a quantity of from 1 to 20 mg/m$^2$ calculated without the anions of polymeric carboxylic or sulphonic acids.

The magnetic layer may in particular have a dry layer thickness of from 0.5 to 2 μm and the antistatic layer a dry layer thickness of from 0.05 to 0.2 μm.

The antistatic layer is preferably applied underneath the magnetic layer.

In a further preferred embodiment of the invention two antistatic layers are applied one over and the other underneath the magnetic layer but always on the same side of the support as the magnetic layer.

EXAMPLES 1–5

1. Preparation of polyethylene dioxythiophene 1.1 Preparation of the free PSS acid 1 Liter of a 7.5% by weight solution of the sodium salt of polystyrene sulphonic acid ($\overline{MW}$ about 40,000) is run through a glass column containing 3 liters of strongly acid ion exchanger in the H+ form and the free acid is collected. The ion exchanger is subsequently rinsed with about 3 liters of deionised water. Solids content of the PSS solution about 2.5% by weight, total volume about 4 liters.

1.2 Preparation of polyethylene dioxythiophene (PEDT/PSS solution)

60 g of potassium persulphate and 0.5 g of Fe$_2$(SO$_4$)$_3$ are introduced into the 4 liters of 2.5% by weight PSS solution prepared as described above and the mixture is stirred until dissolved. 28.0 g of 3,4-ethylenedioxythiophene are then added with stirring and made up to 5 kg with deionised water. The reaction mixture is then stirred for 24 hours at 20°–25° C. This solution is diluted with 5 liters of water and 500 g of strongly acid ion exchanger (H-form) moist with water and 500 g of weakly basic ion exchanger (OH-form) moist with water are added and the mixture is slowly stirred at room temperature for 8 hours. The ion exchanger is then filtered off through a coarse nylon filter cloth.

Solids content of the solution: 1.2% by weight

The K+ and SO$_4^{2-}$ content are examined analytically.

The K+ content should be <450 ppm, the SO$_4^{2-}$ content below 0.1 g/l and the Fe content below 4 ppm.

Preparation of the solutions used for application of the antistatic layer 2.1 Antistatic solution 1 (ASt-1)
 8.3 ml PEDT/PSS solution
 16.7 ml water
 10 ml methanol
 65 ml acetone 2.2 Antistatic solution 2 (ASt-2)
 8.3 ml PEDT/PSS solution
 1.7 ml water
 25 ml methanol
 65 ml acetone 2.3 Antistatic solution 3 (ASt-3)
 8.3 ml PEDT/PSS solution
 91.7 ml water 2.4 PSS Antistatic solution (ASt-4)
 Solution A:
 33 ml PSS-Na solution (13% by weight in H$_2$O; $\overline{MW}$ about 40,000)
 2 ml water
 65 ml methanol
 Solution B:
 300 ml methanol
 600 ml acetone
 Solution A introduced into Solution B with stirring.

Preparation of the solutions for the covering layer (DS)

| 3.1 | | DS-1 | DS-2 |
|---|---|---|---|
| Cellulose diacetate (10% by wt. in acetone) | (ml) | 2 | 2 |
| Methanol | (ml) | 33 | 53 |
| Acetone | (ml) | 63 | 43 |
| Water | (ml) | 1.7 | 1.9 |
| Polyethylene dispersion (5% by wt. in H$_2$O) | (ml) | 0.3 | 1.0 |

4. Preparation of the magnetic layer solutions 4.1 Grinding dispersion 1 (MD-1)
 250 g γ-Fe$_2$O$_3$ pigment treated with cobalt, needles with average particle diameter of from 0.15 to 0.30 μm, length to width ratio from 5:1 to 6:1
 12.5 g phosphoric acid ester wetting agent and
 487.5 g tricresylphosphate are mixed in a vessel with stirring while the temperature is maintained at about 20° C. by cooling with water.

75 ml of glass balls 1 mm and 2 mm in diameter are added to this mixture and the mixture is stirred with a perforated grinding disc whose diameter is about ⅔ of the diameter of the vessel. The speed of stirring is 1850 rpm. A very good magnetic dispersion almost free from agglomerates is obtained after a grinding time of 6 hours.

The glass balls are subsequently separated from the magnetic dispersion by pressure filtration through a close meshed filter cloth.

4.2 Grinding dispersion 2 (MD-2)

A grinding dispersion containing binder is prepared analogously to grinding dispersion 1 as follows:
 40 g cellulose triacetate are dissolved in
 646 ml methylene chloride and
 72.5 ml methanol.
 5.1g triphenylphosphate,
 1.6g i-cetyl stearate,
 4.8g lauric acid and
 6.4g polyphosphoric acid ester wetting agent are then added to the solution.

When the components have been thoroughly mixed, 160 g of the magnetic pigment described under MD-1 are slowly added and the mixture is stirred for 4 hours at 1900 rpm with vigorous cooling in the presence of the glass balls as described above.

The dispersion obtained somewhat less finely divided but virtually free from agglomerates.

4.3 Grinding dispersion 3 (MD-3)

A mixture of 120 g of the same magnetic pigment as under MD-1 (Co-doped γ-Fe$_2$O$_3$) in 150 ml of an 11% by weight polymethyl methacrylate solution and 150 ml of 2-methoxypropanol are ground for 4 hours in a pearl mill at a stirring speed of 3000 rpm and then separated from the grinding balls.

4.4 Casting solution for the magnetic layer (MS-1)
  75 g cellulose triacetate are dissolved in
  623 ml methylene chloride and
  69 ml methanol with stirring and
  9.6 g triphenylphosphate
  3.0 g i-cetylstearate,
  2 ml acetone and
  3.21 g MD-2 are then added.

The mixture is vigorously stirred (about 000 rpm) for 15 minutes in a conventional laboratory dissolver and may then be applied to an unsubbed cellulose triacetate support by means of a washing roller. Wet application: 56 μm, dry layer thickness 2.6 μm, application of magnetic pigment: 60 mg/m².

4.5 Casting solution MS-2
Casting solution MS-2 prepared analogously to casting solution MS-1 has the following composition:
  75 g cellulose triacetate
  23 ml methylene chloride
  69 ml methanol
  9.6 g triphenylphosphate
  3.0 g i-cetylstearate
  32 ml acetone
  3.21 g MD-1.

4.6 Casting solution MS-3
3.21 g of MD-3 are added with stirring to a solution of 30 g of polymethylmethacrylate in 400 ml of acetone and 100 ml of methoxypropanol (viscosity of solution about 1000 mPas) and the mixture is stirred for 15 minutes at 2000 rpm and may then be applied to a PET support carrying a PVDC bonding layer (88% by weight vinylidene chloride, 10% by weight methyl acrylate, 2% by weight itaconic acid) and a PEDT antistatic layer.

The casting solutions described are then used for preparing the back coatings shown in Table 1 (sequence of layers starting from the support).

TABLE 1

| Example | 1 | 2 | 3 | 4 | 5 |
|---|---|---|---|---|---|
| Support | CTA | CTA | CTA | CTA | PET |
| Bonding layer | — | — | — | — | PVDC |
| Antistatic layer | ASt-2 | ASt-4 | — | — | ASt-3 |
| Transparent magnetic layer | MS-2 | MS-2 | MS-1 | MS-1 | — |
| Antistatic layer | — | — | ASt-1 | ASt-4 | — |
| Covering layer | — | — | DS-1 | DS-2 | — |
| Covering layer with magnetic pigment | — | — | — | — | MS-3 |
| Fe₂O₃ application [mg/m²] | 60 | 60 | 60 | 60 | 60 |
| Layer thickness of magnetic layer [μm] | 2.6 | 2.6 | 2.7 | 2.7 | 1.8 |
| Adherence of magnetic layer | + | − | + | + | + |
| Magnetic data: Saturation $B_S$ [G] | 2990 | 2965 | 2985 | 2960 | 2650 |
| Remanence $B_R$ [G] | 2610 | 2538 | 2595 | 2570 | 2130 |
| Conductivities as surface resistance [Ω/unit square] pure antistatic layer* | $<2 \cdot 10^7$ | $8 \cdot 10^9$ | $3 \cdot 10^7$ | $3 \cdot 10^9$ | $\geq 10^{10}$ |
| Magnetic layer (on antistatic layer) [Ω/unit square] (permanence) | $\geq 7 \cdot 10^{12}$ | $\geq 10^{13}$ | — | — | <0.0064 |
| Surface resistance after processing | — | — | $9 \cdot 10^7$ | $>10^{13}$ | — |
| Decay time [ms] | <0.0064 | 2.5 | — | — | <0.0064 |

*Measurement without magnetic layer

Table 1 shows the advantages according to the invention:

1. If the transparent magnetic layer is applied to the water-soluble ionogenic PSS antistatic layer, insufficient adherence of the layer is obtained (see Example 2) combined with only moderate conductivity, which can be calculated from the decay time.

If the PSS antistatic layer is applied over the magnetic layer, the surface conductivity is directly measurable but it is not permanent, i.e. it is virtually zero after development (see Example 4).

If, on the other hand, the PEDT antistatic layer is applied underneath the magnetic layer in accordance with the invention, it has good adherence to the support regardless of the binder composition of the magnetic layer (Examples 1 and 5).

The antistatic effect of the PEDT antistatic layer is permanent regardless of the position of the layer, i.e. the effect is not lost by processing of the layers.

Arrangement of the PEDT antistatic layer underneath the magnetic layer provides the additional advantage of a somewhat higher magnetic saturation and remanence (Examples 3 and 4).

EXAMPLES 6 and 7

A support of PET was covered by various layers as shown below:

| Example 6 | Example 7 |
|---|---|
| cover layer | cover layer |
| magnetic and antistatic layer | magnetic layer |
| intermediate layer | intermediate layer |
|  | antistatic layer |
| subbing layer | subbing layer |
| PET-support | PET-support |

6.1 The subbing layer was produced by casting the following dispersion on the PET-support in an amount of 7.7 ml/m².

1 l of the casting solution contained 246 ml of a 20% by weight aqueous polymer latex of 88% by weight of vinylidene chloride, 10% by weight of methyl acrylate and 2% by weight of itaconic acid based on the total of monomers,
  48 g of colloidal SiO₂
  18.5 ml of a wetting agent (9% by weight solution in a water/ethanol mixture) and
  1.7 ml of a surface active agent (20% by weight solution in water)
  Water up to 1 l.

6.2 On top of the subbing layer an intermediate layer was applied by casting the following solution with a wet layer thickness of 35 μm and a dry layer thickness of 2.3 μm:
  70 g of polyvinylbutyral
  5 g of a polyisocyanate based on biurete-modified hexamethylenediisocyanate
  7.5 mg of dibutyl tin(IV)dilaurate as catalyst
  9.60 ml of a tetrahydrofurane/cyclohexanone mixture (7:1 by volume)

6.3 On top of the intermediate layer a magnetic and antistatic layer was applied by casting the following dispersion with a wet layer thickness of 5 μm and a dry layer thickness of 0.7 μm:

12 g of a Co-doped $\gamma$-$Fe_2O_3$ pigment with a particle diameter of from 0.15 to 0.30 μm
    130 g of a polyurethane binding agent
    0.3 g of polyvinylchloride
    0.12 g of lecithine
    0.34 g of lauric acid
    300 ml of the PEDT/PSS solution of Example 1.2
    0.1 g of a wetting agent
    557 ml of a tetrahydrofurane/cyclohexanone mixture (4:1 by volume)

The layer contained 60 mg/m$^2$ of the magnetic pigment and 20 mg/m$^2$ of the antistatic agent (PEDT/PSS).

6.4 On top of the magnetic/antistatic layer a cover layer was applied by casting the following solution with a wet layer thickness of 20 μm and a dry layer thickness of 0.2 μm:

10 g of a polyurethane binding agent
    0.1 g of a slip agent
    0.25 g of beads of polymethylmethacrylate with a bead diameter of 0.8 μm
    993 ml of a methethylketone/cyclohexanone mixture (9:1 by volume)

7.1 The same subbing layer as in 6.1 was cast on a PET-support.

7.2 On top of the subbing layer an antistatic layer was applied by casting the following solution with a wet layer thickness of 11.1 ml/m$^2$ and a coating weight of PEDT/PSS (solids) of 22.2 mg/m$^2$:

20 ml of 20% by weight aqueous polymer latex of 88% by weight of vinylidene chloride, 10% by weight of methyl acrylate and 2% by weight of itaconic acid based on the total of monomers.
    166 g of PEDT/PSS solution of Example 1.2
    Water up to 1 l 7.3 On top of the antistatic layer the same intermediate layer as in 6.2 was applied.

7.4 On top of the intermediate layer a magnetic layer was applied by casting the following dispersion with a wet layer thickness of 2 μm and a dry layer thickness of 0.3 μm:

33.1 g of a Co-doped $\gamma$-$Fe_2O_3$ pigment with a particle diameter of from 0.15 μm to 0.30 μm
    116 g of a polyurethane binding agent
    629.7 g of cyclohexanone
    294 g of tetrahydrofurane The layer contained 60 mg/m$^2$ of the magnetic pigment.

7.5 On top of the magnetic layer the same cover layer as in 6.4 was applied.

Surface resistance after processing (SR) and decay time (RC) are determined of the products of Examples 6 and 7:

| Example | SR [Ω/☐] | RC [ms] |
|---|---|---|
| 6 | $>10^{13}$ | $>10^3$ |
| 7 | $2 \cdot 10^7$ | $<0.003$ |

The figures demonstrate that addition of the antistatic agent to the magnetic layer leads to high electrical resistance and long decay times or, with other words, to insufficient antistatic effects.

EXAMPLE 8

A support of polyethylene naphthalate (PEN) was covered by various layers shown below:
    cover layer
    magnetic layer
    intermediate layer
    conductive subbing layer
    PEN-support The compositions of intermediate layer, magnetic layer and cover layer were the same as in Example 7.

The conductive subbing layer was produced by casting the following solution on the support in a wet layer thickness of 11.1 ml/m$^2$:

222 ml of the PEDT/PSS solution of Example 1.2
    189 ml of the aqueous polymer latex described in 6.1
    15.5 ml colloidal $SiO_2$ (36% by weight)
    30 ml aqueous solution of wetting agent (5% by weight)
    Water up to 1 l The following results were obtained:

$SR\ [\Omega\square] = <10^6;\ RC[ms] = <0.001$

We claim:

1. Photographic material comprising a transparent film support having on one side at least one light-sensitive layer and on the other side a transparent magnetic layer, characterised in that an antistatic layer of a polythiophene is arranged on the same side of the transparent film support as said transparent magnetic layer below or above said transparent magnetic layer.

2. Photographic material according to claim 1, characterised in that the polythiophene is polyethylenedioxythiophene.

3. Photographic material according to claim 1, characterised in that the polythiophene contains anions of polymeric carboxylic acids or of polymeric sulphonic acids.

4. Photographic material according to claim 1, characterised in that the magnetic layer contains $\gamma$-$Fe_2O_3$ as magnetic pigment.

5. Photographic material according to claim 4, characterised in that the $\gamma$-$Fe_2O_3$ is doped or surface-treated with cobalt.

6. Photographic material according to claim 3, characterised in that the magnetic layer Contains a magnetic pigment in a quantity of from 30 to 100 mg/m$^2$ and the antistatic layer contains the polythiophene in a quantity of from 1 to 20 mg/m$^2$ calculated without the anions of polymeric carboxylic or sulphonic acids.

7. Photographic material according to claim 1, characterised in that the film support consists of from 90 to 98 mol-% of polyethylene terephthalate, from 2 to 10 mol-% of polyethylene sulphoisophthalate and optionally other polyesters.

8. Photographic material according to claim 1, characterized in that the antistatic layer is arranged underneath the magnetic layer.

9. Photographic material according to claim 1, wherein said magnetic layer has a dry layer thickness of from 0.5 to 0.2 μm and said antistatic layer has a dry thickness of from 0.05 to 0.2 μm.

10. Photographic material according to claim 9, wherein the antistatic layer is applied underneath the magnetic layer.

11. Photographic material according to claim 1, wherein the transparent film support is of polyethylene naphthalate.

* * * * *